US010424786B1

(12) United States Patent
Mason et al.

(10) Patent No.: US 10,424,786 B1
(45) Date of Patent: Sep. 24, 2019

(54) ELECTROACTIVE MATERIALS FOR METAL-ION BATTERIES

(71) Applicant: Nexeon Limited, Abingdon Oxfordshire (GB)

(72) Inventors: Charles Mason, Abingdon (GB); Richard Taylor, Abingdon (GB); Christopher Michael Friend, Abingdon (GB)

(73) Assignee: Nexeon Limited, Abingdon (GB)

( * ) Notice: Subject to any disclaimer, the term of this patent is extended or adjusted under 35 U.S.C. 154(b) by 0 days.

(21) Appl. No.: 16/274,187

(22) Filed: Feb. 12, 2019

(30) Foreign Application Priority Data

Dec. 19, 2018 (GB) .................................. 1820695.3

(51) Int. Cl.
| H01M 4/36 | (2006.01) |
| H01M 4/38 | (2006.01) |
| H01M 10/0525 | (2010.01) |
| H01M 4/62 | (2006.01) |
| H01M 4/02 | (2006.01) |

(52) U.S. Cl.
CPC ........... *H01M 4/366* (2013.01); *H01M 4/386* (2013.01); *H01M 4/625* (2013.01); *H01M 10/0525* (2013.01); *H01M 2004/021* (2013.01); *H01M 2004/025* (2013.01)

(58) Field of Classification Search
CPC .............................. H01M 4/362; H01M 4/386
See application file for complete search history.

(56) References Cited

U.S. PATENT DOCUMENTS

| 5,624,606 A | 4/1997 | Wilson et al. |
| 5,798,137 A | 8/1998 | Lord et al. |
| 7,361,431 B2 | 4/2008 | Kim et al. |
| 7,722,991 B2 | 5/2010 | Zhang et al. |
| 8,057,900 B2 | 11/2011 | Luhrs et al. |
| 8,361,659 B2 | 1/2013 | Richard |
| 8,562,869 B2 | 10/2013 | Mah et al. |
| 8,673,502 B2 | 3/2014 | Petrat et al. |
| 8,778,541 B2 | 7/2014 | Yamamoto et al. |
| 8,906,555 B2 | 12/2014 | Hwang et al. |
| 8,945,431 B2 | 2/2015 | Schulz et al. |
| 9,039,939 B2 | 5/2015 | Sano |
| 9,373,838 B2 | 6/2016 | Yushin et al. |
| 9,593,413 B2 | 3/2017 | Amine et al. |
| 9,876,221 B2 | 1/2018 | Kim et al. |
| 9,997,784 B2 | 6/2018 | Su et al. |
| 10,000,425 B2 | 6/2018 | Le Costaouec et al. |
| 10,128,490 B2 | 11/2018 | Lee et al. |
| 10,147,950 B2 | 12/2018 | Sakshaug et al. |
| 10,170,753 B2 | 1/2019 | Ren et al. |
| 2006/0057355 A1 | 3/2006 | Suzuki et al. |
| 2011/0309310 A1 | 12/2011 | Koller et al. |
| 2012/0156493 A1* | 6/2012 | Maisels ................. H01M 4/386 428/402 |
| 2012/0264020 A1 | 10/2012 | Burton et al. |
| 2013/0209348 A1 | 8/2013 | Ludvik |
| 2013/0280601 A1 | 10/2013 | Geramila |
| 2013/0344391 A1 | 12/2013 | Yushin et al. |
| 2014/0057179 A1 | 2/2014 | Yushin et al. |
| 2014/0272592 A1 | 9/2014 | Thompkins |
| 2015/0321920 A1 | 11/2015 | Geramila |
| 2016/0104882 A1 | 4/2016 | Yushin et al. |
| 2016/0298234 A1 | 10/2016 | Yang |
| 2016/0351894 A1 | 12/2016 | Wagner et al. |
| 2017/0092950 A1 | 3/2017 | Xiao et al. |
| 2017/0170477 A1* | 6/2017 | Sakshaug ............ H01M 4/0416 |
| 2017/0301917 A1 | 10/2017 | Yuge |
| 2017/0346084 A1 | 11/2017 | Sakshaug et al. |
| 2018/0151884 A1 | 5/2018 | Yushin et al. |
| 2018/0331356 A1 | 11/2018 | Feaver |
| 2018/0342732 A1 | 11/2018 | Troegel et al. |

FOREIGN PATENT DOCUMENTS

| CN | 102214817 A | 10/2011 |
| CN | 102456876 A | 5/2012 |
| CN | 104577084 A | 4/2015 |
| CN | 105489891 A | 4/2016 |
| CN | 103840140 B | 12/2017 |

(Continued)

OTHER PUBLICATIONS

X. Shen et al., "Research progress on silicon/carbon composite anode materials for lithium-ion battery," J. Energy Chemistry, 27, 1067-1090 (2018).
X. Zuo et al., "Silicon based lithium-ion battery anodes: A chronicle perspective review," Nano Energy, 31, 113-143 (2017).
Bardet et al., "In situ investigation of mesoporous silicon oxidation kinetics using infrared emittance spectroscopy," Phys. Chem. Chem. Phys., 18, 18201-308 (2016).
Cadoret et al., "Silicon Chemical Vapor Deposition on macro and submicron powders in a fluidized bed," Powder Technology, 190(102), 185-91 (2009).
Coppey et al., "Decorated carbon nanotubes by silicon deposition in fluidized bed for Li-ion battery anodes," Chem. Eng. Res. Des. 91, 2491-96 (2013).
Curdts et al., "Upscaling the chemical vapour infiltration process of activated carbon with TMS," Physics Procdia, 46, 248-54 (2013).
Wilson et al., "Lithium Insertion in Carbons Conatining Nanodispersed Silicon," J. Electrochem. Soc., 142(2), 326-332 (1995).

(Continued)

Primary Examiner — Peter F Godenschwager
(74) Attorney, Agent, or Firm — McDonnell Boehnen Hulbert & Berghoff LLP

(57) ABSTRACT

The invention relates to a particulate material comprising a plurality of composite particles, wherein the composite particles comprise: (a) a porous carbon framework comprising micropores and mesopores having a total pore volume of at least 0.6 $cm^3/g$ and no more than 2 $cm^3/g$, where the volume fraction of micropores is in the range from 0.5 to 0.9 and the volume fraction of pores having a pore diameter no more than 10 nm is at least 0.75, and the porous carbon framework has a $D_{50}$ particle size of less than 20 μm; (b) silicon located within the micropores and/or mesopores of the porous carbon framework in a defined amount relative to the volume of the micropores and/or mesopores.

29 Claims, No Drawings

(56) References Cited

FOREIGN PATENT DOCUMENTS

| | | | |
|---|---|---|---|
| CN | 107425180 | A | 12/2017 |
| CN | 107863513 | A | 3/2018 |
| CN | 108428876 | A | 8/2018 |
| CN | 109004203 | A | 12/2018 |
| DE | 102014211012 | A1 | 12/2015 |
| EP | 3 086 388 | B1 | 6/2018 |
| JP | 2003100284 | A | 4/2003 |
| JP | 4069465 | B2 | 4/2008 |
| JP | 5647366 | B1 | 12/2014 |
| JP | 6167127 | B2 | 7/2017 |
| JP | 6451340 | B2 | 1/2019 |
| KR | 101665099 | B1 | 10/2016 |
| KR | 20160126857 | A | 11/2016 |
| KR | 20180024922 | A | 3/2018 |
| KR | 20180078176 | A | 7/2018 |
| KR | 101898110 | B1 | 9/2018 |
| WO | WO 200227822 | A1 | 4/2002 |
| WO | WO 2012097969 | A1 | 7/2012 |
| WO | WO 2016116323 | A1 | 7/2016 |
| WO | WO 2017040299 | A1 | 3/2017 |
| WO | WO 2018165610 | A1 | 9/2018 |
| WO | WO 2018166735 | A1 | 9/2018 |

OTHER PUBLICATIONS

Delhaes, "Chemical vapor deposition and infiltration processes of carbon materials," Carbon, 40, 641-657, (2002).

Holzapfel et al., "A new type of nano-sized silicon/carbon composite electrode for reversible lithium insertion," Chem. Commun., 1566-68 (2005).

Holzapfel et al., "Chemical Vapor Deposited Silicon/Graphite Compound Material as Negative Electrode for Lithium-Ion Batteries," Electrochem. and Sol. State Lett., 8(10), A516-520 (2005).

Holzapfel et al., "Nano silicon for lithium-ion batteries," Electrochem. Acta, 52, 973-78 (2006).

Jaumann et al., "Dichlorosilane-Derived Nano-Silicon inside Hollow Carbon Spheres as High-Performance Anode in Li-Ion Batteries," J. Mater. Chem. A, 5, 9262-9271 (2017).

Jaumann et al.,"SEI-component formation on sub 5 nm sized silicon nanoparticles in Li-ion batteries: the role of electrode preparation, FEC addition and binders," Phys. Chem. Chem. Phus., 17(38), 24956-67 (2015).

Kaae, J. L., "Coating of small particles by chemical vapor deposition while the particles are fluidized," Mat. Res. Soc. Symp. Proc. 372, 139 (1995).

Krzeminski et al., "Silicon dry oxidation kinetics at low temperature in the nanometric range: modeling and experiment," arXiv:1106.3160v1, available at https://arxiv.org/pdf/1106.3160v1.pdf, 54 pages (2011).

Magasinksi et al., "High-performance lithium-ion anodes using a hierachical bottom-up approach," Nature Materials, 9(4), 352-58 (2010).

Kouadri-Mostefa et al., "Silicon Chemical Vapor Deposition (CVD) on microporous powders in a fluidized bed," Powder Technology, 120, 82-87 (2001).

Pflitsch et al., "Chenmical vapor infiltration of activated carbon with tetramethylsilate," Carbon, 79(1), 28-35 (2014).

Reuge et al.,"Modeling of Silicon CVD into Agglomerates of Sub/micrometersiz Particles in a Fluidized Bed," Chem. Vap. Deposition 17, 305-311 (2011).

Saito et al., "Solution combustion synthesis of porous Sn—C composite as anode material for lithium ion batteries," Adv. Powder. Tech., 27,1730-37 (2016).

Vahlas et al., "Principles and applications of CVD powder technology," Mat. Sci. and Eng., R53, 1-72 (2006).

Wang et al., "Chemical vapor deposition and atomic layer deposition for advanced lithium ion batteries and supercapacitors," Energy & Env. Sci., 8, 1889-2014 (2015).

Wang et al., "Facile Preparation of Hierarchically Porous Carbon Monoliths with Well-Ordered Mesostructures," Chem. Mater.,18, 6373-6381 (2006).

Wang et al.,"Synthesis of monolithic 3D ordered macroporous carbon/nano-silicon composites by diiodosilane decomposition," Carbon, 46, 1702-1710 (2008).

Wilson et al., "Carbonaceous Materials Containing Silicon as Anodes for Lithium-Ion Cells," Mat. Res. Soc. Symp. Proc., vol. 393, 305 (1995).

Wilson et al., "Nanodispersed silicon in pregraphitic Carbons," J. Appl. Lett. Phys., 77, 2363-69 (1995).

Yano et al. "Novel method to incorporate Si into monodispersed mesoporous carbon spheres," J. Colloid and Int. Sci., 479, 20-24 (2016).

Yano et al., "Incorporation of silicon into monodispersed starburst carbon spheres with LVD method," Microporous and Mesoporous Mat., 247, 46-51 (2017).

Zhang et al.,"Tin-Nanoparticles Encapsulated in Elastic Hollow Carbon Spheres," Adv. Mater. 20, 1160-1165 (2008).

Search and Examination Report issued in co-pending Great Britain Patent Application No. GB1818232.9, dated Dec. 24, 2018, 9 pages.

Search and Examination Report issued in co-pending Great Britain Patent Application No. GB1818235.2, dated Dec. 24, 2018, 9 pages.

Search and Examination Report issued in co-pending Great Britain Patent Application No. GB1820736.5, dated Jan. 9, 2019, 9 pages.

Search and Examination Report issued in co-pending Great Britain Patent Application No. GB1820742.3, dated Jan. 9, 2019, 9 pages.

Co-Pending U.S. Appl. No. 16/247,182, filed Feb. 12, 2019.

Co-Pending U.S. Appl. No. 16/274,185, filed Feb. 12, 2019.

Co-Pending U.S. Appl. No. 16/275,246, filed Feb. 13, 2019.

U.S. Appl. No. 16/275,246, Notice of Allowance, dated Apr. 1, 2019.

U.S. Appl. No. 16/274,182, Office Action, dated May 20, 2019.

\* cited by examiner

ELECTROACTIVE MATERIALS FOR METAL-ION BATTERIES

CROSS-REFERENCE TO RELATED APPLICATIONS

This application claims the benefit of priority of United Kingdom Patent Application no. GB1820695.3, filed Dec. 19, 2018, which is hereby incorporated herein by reference in its entirety.

BACKGROUND OF THE INVENTION

Field

This invention relates in general to electroactive materials that are suitable for use in electrodes for rechargeable metal-ion batteries, and more specifically to particulate materials having high electrochemical capacities that are suitable for use as anode active materials in rechargeable metal-ion batteries. The particulate electroactive materials of the invention have particular utility in hybrid anodes comprising two or more different electroactive materials.

Technical Background

Rechargeable metal-ion batteries are widely used in portable electronic devices such as mobile telephones and laptops and are finding increasing application in electric or hybrid vehicles. Rechargeable metal-ion batteries generally comprise an anode layer, a cathode layer, an electrolyte to transport metal ions between the anode and cathode layers, and an electrically insulating porous separator disposed between the anode and the cathode. The cathode typically comprises a metal current collector provided with a layer of metal ion containing metal oxide based composite, and the anode typically comprises a metal current collector provided with a layer of an electroactive material, defined herein as a material which is capable of inserting and releasing metal ions during the charging and discharging of a battery. For the avoidance of doubt, the terms "cathode" and "anode" are used herein in the sense that the battery is placed across a load, such that the cathode is the positive electrode and the anode is the negative electrode. When a metal-ion battery is charged, metal ions are transported from the metal-ion-containing cathode layer via the electrolyte to the anode and are inserted into the anode material. The term "battery" is used herein to refer both to a device containing a single anode and a single cathode and to devices containing a plurality of anodes and/or a plurality of cathodes.

There is interest in improving the gravimetric and/or volumetric capacities of rechargeable metal-ion batteries. The use of lithium-ion batteries has already provided a substantial improvement when compared to other battery technologies, but there remains scope for further development. To date, commercial lithium-ion batteries have largely been limited to the use of graphite as an anode active material. When a graphite anode is charged, lithium intercalates between the graphite layers to form a material with the empirical formula $Li_xC_6$ (wherein x is greater than 0 and less than or equal to 1). Consequently, graphite has a maximum theoretical capacity of 372 mAh/g in a lithium-ion battery, with a practical capacity that is somewhat lower (ca. 340 to 360 mAh/g). Other materials, such as silicon, tin and germanium, are capable of intercalating lithium with a significantly higher capacity than graphite but have yet to find widespread commercial use due to difficulties in maintaining sufficient capacity over numerous charge/discharge cycles.

Silicon in particular has been identified as a promising alternative to graphite for the manufacture of rechargeable metal-ion batteries having high gravimetric and volumetric capacities because of its very high capacity for lithium (see, for example, Insertion Electrode Materials for Rechargeable Lithium Batteries, Winter, M. et al. in Adv. Mater. 1998, 10, No. 10). At room temperature, silicon has a theoretical maximum specific capacity in a lithium-ion battery of about 3,600 mAh/g (based on $Li_{15}Si_4$). However, the use of silicon as an anode material is complicated by large volumetric changes on charging and discharging.

Intercalation of lithium into bulk silicon leads to a large increase in the volume of the silicon material, up to 400% of its original volume when silicon is lithiated to its maximum capacity, and repeated charge-discharge cycles cause significant mechanical stress in the silicon material, resulting in fracturing and delamination of the silicon anode material. Volume contraction of silicon particles upon delithiation can result in a loss of electrical contact between the anode material and the current collector. A further difficulty is that the solid electrolyte interphase (SEI) layer that forms on the silicon surface does not have sufficient mechanical tolerance to accommodate the expansion and contraction of the silicon. As a result, newly exposed silicon surfaces lead to further electrolyte decomposition and increased thickness of the SEI layer and irreversible consumption of lithium. These failure mechanisms collectively result in an unacceptable loss of electrochemical capacity over successive charging and discharging cycles.

A number of approaches have been proposed to overcome the problems associated with the volume change observed when charging silicon-containing anodes. The most widespread approach to address the irreversible capacity loss of silicon-containing anodes is to use some form of finely structured silicon as the electroactive material. It has been reported that fine silicon structures below around 150 nm in cross-section, such as silicon films and silicon nanoparticles are more tolerant of volume changes on charging and discharging when compared to silicon particles in the micron size range. However, neither of these is particularly suitable for commercial scale applications in their unmodified form; nanoscale particles are difficult to prepare and handle and silicon films do not provide sufficient bulk capacity. For example, nanoscale particles tend to form agglomerates, making it difficult to obtain a useful dispersion of the particles within an anode material matrix. In addition, the formation of agglomerates of nanoscale particles results in an unacceptable capacity loss on repeated charge-discharge cycling.

Ohara et al. (Journal of Power Sources 136 (2004) 303-306) have described the evaporation of silicon onto a nickel foil current collector as a thin film and the use of this structure as the anode of a lithium-ion battery. Although this approach gives good capacity retention, the thin film structures do not give useful amounts of capacity per unit area, and any improvement is eliminated when the film thickness is increased.

WO 2007/083155 discloses that improved capacity retention may be obtained through the use of silicon particles having high aspect ratio, i.e. the ratio of the largest dimension to the smallest dimension of the particle.

It is also known in general terms that electroactive materials such as silicon may be deposited within the pores of a porous carrier material, such as an activated carbon material.

These composite materials provide some of the beneficial charge-discharge properties of nanoscale silicon particles while avoiding the handling difficulties of nanoparticles. For instance, Guo et al. (Journal of Materials Chemistry A, 2013, pp. 14075-14079) discloses a silicon-carbon composite material in which a porous carbon substrate provides an electrically conductive framework with silicon nanoparticles deposited within the pore structure of the substrate with uniform distribution. SEI formation over the initial charging cycles is confined to the remaining pore volume such that the remaining silicon is not exposed to the electrolyte in subsequent charging cycles. It is shown that the composite material has improved capacity retention over multiple charging cycles, however the initial capacity of the composite material in mAh/g is significantly lower than for silicon nanoparticles.

JP2003100284 discloses an active material comprising a carbon-based scaffold with small pores branching off from a few larger pores. An electroactive material (e.g. silicon) is indiscriminately located on the walls of both large and small pores and on the external surface of the carbon-based scaffold.

Despite the efforts to date, there is a continued need for improvements in the electrochemical storage capacity of lithium-ion batteries. Although one long-term objective is to develop electrodes containing a high proportion of silicon as the electroactive material, another objective of battery manufacturers is to identify ways of using small amounts of silicon to supplement the capacity of graphite anodes. A current focus is therefore on obtaining incremental improvements to existing metal-ion battery technology through the use of "hybrid" electrodes comprising a combination of graphite and Si-based electroactive materials rather than a wholesale transition from graphite anodes to silicon anodes.

The use of hybrid electrodes presents challenges of its own. Any additional electroactive material must be provided in a form which is compatible with the graphite particulate forms conventionally used in metal-ion batteries. For example, it must be possible to disperse the additional electroactive material throughout a matrix of graphite particles and the particles of the additional electroactive material must have sufficient structural integrity to withstand compounding with graphite particles and subsequent formation of an electrode layer, for example via steps such as compressing, drying and calendering.

Furthermore, differences in the metallation properties of graphite and other electroactive materials must be taken into account when developing hybrid anodes. For example, in the lithiation of a silicon-graphite hybrid anode in which graphite constitutes at least 50 wt % of the electroactive material, the silicon needs to be lithiated to its maximum capacity to gain the capacity benefit from all the electroactive material. Whereas in a non-hybrid silicon electrode, the silicon material would generally be limited to ca. 25 to 60% of its maximum gravimetric capacity during charge and discharge so as to avoid placing excessive mechanical stresses on the silicon material and a resultant reduction in the overall volumetric capacity of the cell, this option is not available in hybrid electrodes. Consequently, the silicon material must be able to withstand very high levels of mechanical stress through repeated charge and discharge cycles.

There is therefore a need in the art for silicon-containing electroactive materials that combine high lithiation capacity with sufficient capacity retention and structural stability over multiple charge-discharge cycles. In particular, materials that are used to supplement conventional electroactive materials, such as graphite, would need to maintain capacity and structural stability when repeatedly lithiated to their maximum capacity.

SUMMARY OF THE DISCLOSURE

In one aspect, the disclosure provides a particulate material comprising a plurality of composite particles, wherein the composite particles comprise:
 (a) a porous carbon framework comprising micropores and mesopores, wherein
  (i) the micropores and mesopores have a total pore volume as measured by gas adsorption of $P_1$ cm$^3$/g, wherein $P_1$ has a value of at least 0.6 and no more than 2,
  (ii) the volume fraction of micropores ($\varphi_a$) is in the range from 0.5 to 0.9, based on the total volume of micropores and mesopores;
  (iii) the volume fraction of pores having a pore diameter up to 10 nm ($\varphi_{10}$) is at least 0.75, based on the total volume of micropores and mesopores, and
  (iv) the porous carbon framework has a $D_{50}$ particle size of less than 20 µm;
 (b) a plurality of nanoscale domains of elemental silicon located within the micropores and/or mesopores of the porous carbon framework;
wherein the weight ratio of silicon to the porous carbon framework in the composite particles is in the range from $[1 \times P_1$ to $1.9 \times P_1]:1$.

Additional aspects of the disclosure relate to compositions comprising such particulate materials, electrodes including such particulate materials in electrical contact with a current collector, rechargeable metal-ion batteries comprising such electrodes, and uses of such particulate materials as anode active materials. Other aspects will be apparent based on the detailed description below.

DETAILED DESCRIPTION

The present invention addresses certain issues in the art by providing a particulate material comprising a porous carbon framework and a plurality of nanoscale domains of elemental silicon located within the pores of the porous carbon framework. The pore structure of the porous carbon framework and the ratio of silicon to the available pore volume porous carbon framework are each carefully controlled to obtain improved performance, particularly under the demanding criteria required for hybrid electrodes.

In a first aspect, the invention provides a particulate material comprising a plurality of composite particles, wherein the composite particles comprise:
 (a) a porous carbon framework comprising micropores and mesopores, wherein
  (i) the micropores and mesopores have a total pore volume as measured by gas adsorption of $P_1$ cm$^3$/g, wherein $P_1$ has a value of at least 0.6 and no more than 2,
  (ii) the volume fraction of micropores ($\varphi_a$) is in the range from 0.5 to 0.9, based on the total volume of micropores and mesopores;
  (iii) the volume fraction of pores having a pore diameter up to 10 nm ($\varphi_{10}$) is at least 0.75, based on the total volume of micropores and mesopores, and
  (iv) the porous carbon framework has a $D_{50}$ particle size of less than 20 µm;

(b) a plurality of nanoscale domains of elemental silicon located within the micropores and/or mesopores of the porous carbon framework;

wherein the weight ratio of silicon to the porous carbon framework in the composite particles is in the range from $[1 \times P_1$ to $1.9 \times P_1]:1$.

The invention therefore relates to a particulate material in which the porous carbon framework comprises both micropores and mesopores with a minimum total volume of at least 0.6 cm$^3$/g and no more than 2 cm$^3$/g. The total volume of micropores and mesopores is represented herein as $P_1$ cm$^3$/g. $P_1$ itself is a dimensionless quantity which is also used to correlate the available pore volume to the weight ratio of silicon in the particulate material as set out below.

The term "micropore" is used herein to refer to pores of less than 2 nm in diameter, the term "mesopore" is used herein to refer to pores of 2-50 nm in diameter, and the term "macropore" is used to refer to pores of greater than 50 nm and no more than 100 nm in diameter.

The pore volume is distributed between micropores and mesopores such that the volume fraction of micropores is in the range of 0.5 to 0.9, based on the total volume of micropores and mesopores. The volume fraction of micropores (based on the total volume of micropores and mesopores is represented herein by the symbol $\varphi_a$ and the volume fraction of mesopores (based on the total volume of micropores and mesopores) is represented by the symbol $\varphi_b$, and therefore it will be understood that $\varphi_a+\varphi_b=1$.

The porous carbon framework is also defined by a pore volume that is substantially skewed towards smaller pores, such that a minimum of 75% of the total micropore and mesopore volume is in the form of pores having a diameter of no more than 10 nm. The volume fraction of pores having a diameter of no more than 10 nm (based on the total volume of micropores and mesopores) is represented herein by the symbol $\varphi_{10}$, with the symbol $\varphi_5$ being used to define the corresponding volume fraction of pores having a diameter of no more than 5 nm.

The porous carbon framework is furthermore defined by a $D_{50}$ particle size of less than 20 μm For the avoidance of doubt, $P_1$ as used herein relates to the pore volume of the porous carbon framework when measured in isolation, i.e. in the absence of silicon or any other material occupying the pores of the porous carbon framework. Similarly, the references herein to the volume of micropores, mesopores and macropores in the porous carbon framework, and any references to the distribution of pore volume within the porous carbon framework, refer to the internal pore volume of the porous carbon framework in isolation (i.e. in the absence of any silicon or other materials occupying the pore volume).

The weight ratio of silicon to the porous carbon framework in the composite particles is in the range from $[1 \times P_1$ to $1.9 \times P_1]:1$. The weight ratio of silicon to the porous carbon framework is therefore proportional to the available pore volume in the porous carbon framework, such that a weight ratio of $[1 \times P_1]:1$ corresponds to around 43% v/v occupancy of the pores of the porous carbon framework by silicon, taking into account silicon density of around 2.3 g/cm$^3$. The upper limit of the ratio at $[1.9 \times P_1]:1$ corresponds to around 83% v/v occupancy of the pores of the porous carbon framework by silicon.

Elemental silicon is located in the micropores and/or mesopores in the form of a plurality of nanoscale silicon domains. As used herein, the term "nanoscale silicon domain" refers to a nanoscale body of silicon that is located within the pores of the porous carbon framework. The maximum dimensions of the nanoscale silicon domains are defined by the pore diameters of the pores in which the silicon is located.

The invention therefore relates in general terms to a particulate material in which nanoscale domains of silicon occupy a substantial fraction of the pore volume of a porous carbon framework in which the pore volume is mainly distributed between small mesopores (of no more than 10 nm diameter) and micropores. It has been found that this particle architecture provides an electroactive material with very high gravimetric and volumetric capacity on lithiation and high reversible capacity retention over multiple charge-discharge cycles.

Without being bound by theory, it is believed that locating nanoscale silicon domains within small mesopores and/or micropores firstly provides fine silicon structures which are able to lithiate and delithiate without excessive structural stress. It is believed that these very fine silicon domains have a lower resistance to elastic deformation and higher fracture resistance than larger silicon structures. By ensuring that a relatively high proportion of the pore volume is occupied by silicon, the particulate material of the invention has a high capacity. Furthermore, by locating nanoscale silicon domains within small mesopores and/or micropores as described above, only a small area of silicon surface is accessible to electrolyte and SEI formation is therefore limited.

It has been found by the present inventors that the twin objectives of obtaining high capacity and high reversible capacity retention depend on careful control of the distribution of pore sizes. Although very fine silicon structures within micropores might be expected to lithiate reversibly most effectively, it has been found that porous carbon frameworks with an excessive micropore fraction can accommodate relatively low amounts of silicon, such that the volumetric capacity of the material is low. Without being bound by theory, it is believed that deposition of silicon into very highly microporous carbon frameworks results in the formation of silicon structures (such as caps or walls) which block access to unoccupied pore volume, thus limiting the silicon loading that is achievable.

However, if silicon is deposited into carbon frameworks having a very high degree of mesoporosity, then the silicon nanostructures are undesirably large and the carbon wall thickness is increased. As a result, although higher volumetric capacity can be achieved, both the silicon nanostructures and the porous carbon framework are subjected to excessive structural stress during lithiation—particularly when lithiated to maximum capacity, as is the case in hybrid anodes that also comprise graphite as an electroactive material. This excessive structural stress can result in fracturing of the silicon nanostructures and the porous carbon framework. Additional exposure of silicon from the fracture surfaces to the electrolyte in subsequent charge-discharge cycles then means that SEI formation can become a significant failure mechanism leading to capacity loss. By controlling the relative volume fractions of micropores and mesopores and by ensuring that the mesopore volume is largely confined to pores below 10 nm, the particulate material of the invention avoids these failure mechanisms and maintains high reversible capacity over multiple charge-discharge cycles while also accommodating a large relative proportion of silicon within the pore volume of the porous carbon framework. This stands in clear contrast to the excessive SEI formation that characterizes the material disclosed by Guo, for example (see above).

Although lithiation of the silicon may result in a degree of external expansion of the entire composite material, the careful control of the micropore and mesopore volume fractions and the size distribution of the mesopore volume fraction towards smaller pore diameters ensures that the particulate material is able to deform reversibly without fracturing over multiple charge-discharge cycles. Stress on the carbon framework and the silicon material is therefore controlled at a level that is tolerated over large numbers of charge-discharge cycles without substantial loss of capacity.

As a result of the unique particle architecture of the inventive composite material, the silicon in the particulate material of the invention has electrochemical performance that is comparable to that of fine silicon nanoparticles but without the disadvantages of excessive SEI formation and poor dispersibility that make discrete silicon nanoparticles non-viable as an electrode material for commercial use. The relatively high volumetric content of silicon of the particulate material makes it particularly suitable for use as a component of hybrid anodes.

The porous carbon framework suitably comprises a three-dimensionally interconnected open pore network comprising a combination of micropores and/or mesopores and optionally a minor volume of macropores. The porous carbon framework is characterized by a high pore volume in the form of micropores and/or mesopores. The total volume of micropores and mesopores (i.e. the total pore volume in the range of 0 to 50 nm) is referred to herein as $P_1$ cm$^3$/g, wherein $P_1$ represents a dimensionless natural number having a value of at least 0.6 and no more than 2. As set out above, the value of $P_1$ is also used to correlate the available pore volume in the porous carbon framework to the weight ratio of silicon to the porous carbon framework as set out above.

Preferably, the value of $P_1$ is at least 0.65, more preferably at least 0.7, more preferably at least 0.75, more preferably at least 0.8, more preferably at least 0.85, more preferably at least 0.9, more preferably at least 0.95, and most preferably at least 1. Optionally, the total volume of micropores and mesopores may be greater than 1 cm$^3$/g, for instance, $P_1$ may be at least 1.05, or at least 1.1, or at least 1.15, or at least 1.2.

The use of a high porosity carbon framework is advantageous since it allows a larger amount of silicon to be accommodated within the pore structure, and it has been found that high porosity carbon frameworks in which the pore volume is predominantly in the form of micropores and smaller mesopores have sufficient strength to accommodate the volumetric expansion of the silicon without fracturing or otherwise degrading the porous carbon framework.

The internal pore volume of the porous carbon framework is capped at a value at which increasing fragility of the porous carbon framework outweighs the advantage of increased pore volume accommodating a larger amount of silicon. In general, the value of $P_1$ is no more than 2. However, more preferably, the value of $P_1$ may be no more than 1.8, more preferably no more than 1.6, more preferably no more than 1.5, more preferably no more than 1.4, more preferably no more than 1.3, more preferably no more than 1.2.

In accordance with certain embodiments of the invention, the value of $P_1$ may be, for instance, in the range from 0.65 to 2 (i.e. a total volume of micropores and mesopores of 0.65 to 2 cm$^3$/g), or in the range from 0.65 to 1.8, or in the range from 0.7 to 1.8, or in the range from 0.75 to 1.8, or in the range from 0.8 to 1.8, or in the range from 0.85 to 1.8, or in the range from 0.9 to 1.8, or in the range from 0.65 to 1.7, or in the range from 0.7 to 1.7, or in the range from 0.75 to 1.7, or in the range from 0.8 to 1.7, or in the range from 0.85 to 1.7, or in the range from 0.9 to 1.7, or in the range from 0.95 to 1.7, or in the range from 0.7 to 1.6, or in the range from 0.75 to 1.6, or in the range from 0.8 to 1.6, or in the range from 0.85 to 1.6, or in the range from 0.9 to 1.6, or in the range from 0.95 to 1.6, or in the range from 1 to 1.6, or in the range from 0.75 to 1.5, or in the range from 0.8 to 1.5, or in the range from 0.85 to 1.5, or in the range from 0.9 to 1.5, or in the range from 0.95 to 1.5, or in the range from 1 to 1.5, or in the range from 0.8 to 1.4, or in the range from 0.85 to 1.4, or in the range from 0.9 to 1.4, or in the range from 0.95 to 1.4, or in the range from 1 to 1.4.

The volume fraction of micropores ($\varphi_a$) is preferably in the range from 0.5 to 0.85, more preferably in the range from 0.5 to 0.8, more preferably in the range from 0.55 to 0.8, more preferably in the range from 0.6 to 0.8, to take particular advantage of the high capacity retention of very fine silicon nanostructures located within micropores.

As discussed above, the pore volume is substantially skewed towards smaller pores, such that a minimum of 75% of the total micropore and mesopore volume of the porous carbon framework is in the form of pores having a diameter of no more than 10 nm. More preferably, $\varphi_{10}$ is at least 0.8, more preferably at least 0.85, more preferably at least 0.9.

Preferably, $\varphi_5$ is at least 0.7, more preferably at least 0.75, more preferably at least 0.8, more preferably at least 0.85, based on the total volume of micropores and mesopores. Thus, at least 75% of the total micropore and mesopore volume of the porous carbon framework is preferably in the form of pores having a diameter of no more than 10 nm, and more preferably no more than 5 nm.

A fraction of pores having diameters in the larger mesopore range may be advantageous to facilitate electrolyte access to the silicon domains. Therefore, pores having a diameter in the range of 10 to 50 nm (i.e. larger mesopores) may optionally constitute up to 1%, up to 2%, up to 5%, or up to 10% of the total micropore and mesopore volume of the porous carbon framework.

The pore size distribution of the porous carbon framework may be monomodal, bimodal or multimodal. As used herein, the term "pore size distribution" relates to the distribution of pore size relative to the cumulative total internal pore volume of the porous carbon framework, not only of micropores and mesopores but also of any macropores present. A bimodal or multimodal pore size distribution may be preferred since close proximity between the smallest pores and pores of larger diameter provides the advantage of efficient ionic transport through the porous network to the silicon. Accordingly, the particulate material has high ionic diffusivity and therefore improved rate performance.

Suitably, a bimodal or multimodal pore size distribution includes a peak pore size in the micropore range and a peak pore size in the mesopore size range which differ from one another by a factor of from 5 to 20, more preferably by a factor of about 10. For instance, the porous carbon framework may have a bimodal pore size distribution including a peak at a pore size of 1.5 nm and a peak at a pore size of 7.5 nm.

The total volume of micropores and mesopores and the pore size distribution of micropores and mesopores are determined using nitrogen gas adsorption at 77 K using quenched solid density functional theory (QSDFT) in accordance with standard methodology as set out in ISO 15901-2 and ISO 15901-3. Nitrogen gas adsorption is a technique that characterizes the porosity and pore diameter distributions of a material by allowing a gas to condense in the pores of a solid. As pressure increases, the gas condenses first in the pores of smallest diameter and the pressure is increased until a saturation point is reached at which all of the pores are filled with liquid. The nitrogen gas pressure is then reduced incrementally, to allow the liquid to evaporate from the system. Analysis of the adsorption and desorption isotherms, and the hysteresis between them, allows the pore volume and pore size distribution to be determined. Suitable instruments for the measurement of pore volume and pore size distributions by nitrogen gas adsorption include the TriStar II and TriStar II Plus porosity analyzers, which are available from Micromeritics Instrument Corporation, USA.

Nitrogen gas adsorption is effective for the measurement of pore volume and pore size distributions for pores having a diameter up to 50 nm, but is less reliable for pores of much larger diameter. For the purposes of the present invention, nitrogen adsorption is therefore used to determine pore volumes and pore size distributions only for pores having a diameter up to and including 50 nm. As set out above, the value of $P_1$ is determined by taking into account only pores of diameter up to and including 50 nm (i.e. only micropores and mesopores), and the values of $\varphi_a$, $\varphi_b$, $\varphi_{10}$, and $\varphi_5$ are likewise determined relative to the total volume of micropores and mesopores only.

In view of the limitations of available analytical techniques it is not possible to measure pore volumes and pore size distributions across the entire range of micropores, mesopores and macropores using a single technique. In the case that the porous carbon framework comprises macropores, the volume of pores in the range of greater than 50 nm and up to 100 nm is identified herein with the value of $P_2$ cm$^3$/g and is measured by mercury porosimetry. As set out above, the value of $P_2$ relates to the pore volume of the porous carbon framework when measured in isolation, i.e. in the absence of silicon or any other material occupying the pores of the porous carbon framework.

For the avoidance of doubt, the value of $P_2$ takes into account only pores having a diameter of from greater than 50 nm up to and including 100 nm, i.e. it includes only the volume of macropores up to 100 nm in diameter. Any pore volume measured by mercury porosimetry at pore sizes of 50 nm or below is disregarded for the purposes of determining the value of $P_2$ (as set out above, nitrogen adsorption is used to characterize the mesopores and micropores). Pore volume measured by mercury porosimetry above 100 nm is assumed for the purposes of the invention to be inter-particle porosity and is also not take into account in the measurement of macropores or when determining the value of $P_2$.

Mercury porosimetry is a technique that characterizes the porosity and pore diameter distributions of a material by applying varying levels of pressure to a sample of the material immersed in mercury. The pressure required to intrude mercury into the pores of the sample is inversely proportional to the size of the pores. Values obtained by mercury porosimetry as reported herein are obtained in accordance with ASTM UOP578-11, with the surface tension y taken to be 480 mN/m and the contact angle φ taken to be 1400 for mercury at room temperature. The density of mercury is taken to be 13.5462 g/cm$^3$ at room temperature. A number of high precision mercury porosimetry instruments are commercially available, such as the AutoPore IV series of automated mercury porosimeters available from Micromeritics Instrument Corporation, USA. For a complete review of mercury porosimetry reference may be made to P. A. Webb and C. Orr in "Analytical Methods in Fine Particle Technology, 1997, Micromeritics Instrument Corporation, ISBN 0-9656783-0.

The volume of macropores (and therefore the value of $P_2$) is preferably small as compared to the volume of micropores and mesopores (and therefore the value of $P_1$). While a small fraction of macropores may be useful to facilitate electrolyte access into the pore network, the advantages of the invention are obtained substantially by accommodating silicon in micropores and smaller mesopores.

Thus, in accordance with certain embodiments of the invention the total volume of macropores in the porous carbon framework is $P_2$ cm$^3$/g as measured by mercury porosimetry, wherein $P_2$ preferably has a value of no more than $0.2 \times P_1$, or no more than $0.1 \times P_1$, or no more than $0.05 \times P_1$, or no more than $0.02 \times P_1$, or no more than $0.01 \times P_1$, or no more than $0.005 \times P_1$.

$P_2$ preferably has a value of no more than 0.3, or no more than 0.25, or no more than 0.20, or no more than 0.15, or no more than 0.1, or no more than 0.05. As discussed above in relation to larger mesopores, a small pore volume fraction in the macropore range may be advantageous to facilitate electrolyte access to the silicon.

The open pore network optionally includes a hierarchical pore structure, i.e. a pore structure in which there is a degree of ordering of pore sizes, with smaller pores branching from larger pores.

It will be appreciated that intrusion techniques such as gas adsorption and mercury porosimetry are effective only to determine the pore volume of pores that are accessible to nitrogen or to mercury from the exterior of the porous carbon framework. Porosity values ($P_1$ and $P_2$) as specified herein shall be understood as referring to the volume of open pores, i.e. pores that are accessible to a fluid from the exterior of the porous carbon framework. Fully enclosed pores which cannot be identified by nitrogen adsorption or mercury porosimetry shall not be taken into account herein when specifying porosity values. Likewise, any pore volume located in pores that are so small as to be below the limit of detection by nitrogen adsorption is not taken into account for determining the value of $P_1$.

The porous carbon framework may comprise crystalline carbon or amorphous carbon, or a mixture of amorphous and crystalline carbon. The porous carbon framework may be either a hard carbon or soft carbon framework and may suitably be obtained by known procedures involving the pyrolysis of polymers or organic matter.

As used herein, the term "hard carbon" refers to a disordered carbon matrix in which carbon atoms are found predominantly in the sp$^2$ hybridized state (trigonal bonds) in nanoscale polyaromatic domains. The polyaromatic domains are cross-linked with a chemical bond, e.g. a C—O—C bond. Due to the chemical cross-linking between the polyaromatic domains, hard carbons cannot be converted to graphite at high temperatures. Hard carbons have graphite-like character as evidenced by the large G-band (~1600 cm-1) in the Raman spectrum. However, the carbon is not fully graphitic as evidenced by the significant D-band (~1350 cm-1) in the Raman spectrum.

As used herein, the term "soft carbon" also refers to a disordered carbon matrix in which carbon atoms are found predominantly in the sp$^2$ hybridized state (trigonal bonds) in polyaromatic domains having dimensions in the range of 5-200 nm. In contrast to hard carbons, the polyaromatic domains in soft carbons are associated by intermolecular forces but are not cross-linked with a chemical bond. This means that they will graphitize at high temperature. The porous carbon framework preferably comprises at least 50% sp$^2$ hybridized carbon as measured by XPS. For example, the porous carbon framework may suitably comprise from 50% to 98% sp² hybridized carbon, from 55% to 95% sp² hybridized carbon, from 60% to 90% sp² hybridized carbon, or from 70% to 85% sp² hybridized carbon.

A variety of different polymeric materials may be used to prepare suitable porous carbon frameworks. Examples of polymeric materials which form porous carbon frameworks on pyrolysis include phenolic resins, novolac resins, pitch, melamines, polyacrylates, polystyrenes, polyvinylalcohol (PVA), polyvinylpyrrolidone (PVP), and various copolymers comprising monomer units of acrylates, styrenes, α-olefins, vinyl pyrrolidone and other ethylenically unsaturated monomers. A variety of different hard carbon materials are available in the art depending on the starting material and the conditions of the pyrolysis process.

The porous carbon framework may undergo a chemical or gaseous activation process to increase the volume of mesopores and micropores. A suitable activation process comprises contacting pyrolysed carbon with one or more of oxygen, steam, CO, $CO_2$ and KOH at a temperature in the range from 600 to 1000° C.

Mesopores can also be obtained by known templating processes, using extractable pore formers such as MgO and other colloidal or polymer templates which can be removed by thermal or chemical means post pyrolysis or activation.

The porous carbon framework may have a $D_{50}$ particle diameter in the range from 0.5 to 20 μm. Preferably, the $D_{50}$ particle diameter is at least 1 μm, more preferably at least 2 μm, for example at least 3 μm, or at least 4 μm, or at least 5 μm. Preferably, the $D_{50}$ particle diameter of the particulate material is no more than 18 μm, more preferably no more than 16 μm, more preferably no more than 14 μm, more preferably no more than 12 μm, more preferably no more than 10 μm, for example no more than 9 μm, or no more than 8 μm.

For instance, the porous carbon framework may have a $D_{50}$ particle diameter in the range from 1 to 12 μm, or from 1 to 10 μm, or from 2 to 10 μm, or from 3 to 10 μm, or from 3 to 8 μm.

The amount of silicon in the porous carbon framework is correlated to the available pore volume by the requirement that the weight ratio of silicon to the porous carbon framework in the composite particles is in the range from $[1×P_1$ to $1.9×P_1]:1$. This relationship takes into account the density of silicon and the pore volume of the porous carbon framework to define a weight ratio of silicon at which the internal pore volume of the porous carbon framework ($P_1$ cm³/g) is around 43% to 82% v/v occupied by silicon (in the uncharged state).

Preferably, the weight ratio of silicon to the porous carbon framework is at least $1.1×P_1$, more preferably at least $1.15×P_1$, more preferably at least $1.2×P_1$, more preferably at least $1.25×P_1$, more preferably at least $1.3×P_1$, more preferably at least $1.35×P_1$, more preferably at least $1.4×P_1$.

The minimum weight ratio of silicon to the porous carbon framework is correlated to the total micropore and mesopore volume by the requirement that the weight ratio of silicon to the porous carbon framework in the composite particles is at least $1×P_1$. More preferably, the weight ratio of silicon to the porous carbon framework has at least the value given by $[\varphi_b+0.75]×P_1$, more preferably at least the value given by $[\varphi_b+0.8]×P_1$, more preferably at least the value given by $[\varphi_b+0.9]×P_1$, more preferably at least the value given by $[\varphi_b+1]×P_1$, more preferably at least the value given by $[\varphi_b+1.1]×P_1$ (with the proviso that said value is at least $1×P_1$).

Thus, in the case that the mesopore fraction ($\varphi_b$) has a higher value, the minimum amount of silicon in the composite particles is also higher. This correlation between mesopore fraction and the minimum weight ratio of silicon to the porous carbon framework ensures that porous carbon frameworks having higher mesopore fractions are occupied by silicon to a higher extent, thus improving the volumetric capacity of the particulate material. Ensuring that porous carbon frameworks having higher mesopore fractions have a higher minimum silicon loading also reduces the possibility that larger micropores will be partially occupied by silicon, thus reducing the silicon surface area that is exposed to the electrolyte and thereby limiting undesirable SEI formation.

The maximum weight ratio of silicon to the porous carbon framework is also correlated to the total pore volume by the requirement that the weight ratio of silicon to the porous carbon framework in the composite particles is no more than $1.9×P_1$. More preferably, the weight ratio of silicon to the porous carbon framework is no more than the value given by $[\varphi_b+1.6]×P_1$, more preferably no more than the value given by $[\varphi_b+1.5]×P_1$ (with the proviso that said value is no more than $1.9×P_1$).

The correlation between mesopore fraction and the maximum weight ratio of porous carbon framework ensures that that porous carbon frameworks having higher micropore fractions are not excessively filled by silicon. As set out above, it may be more difficult to achieve very high ratios of silicon in the event that the porous carbon framework is more highly microporous due to the potential for walls or caps to form which enclose occupied pore volume. In addition, in the case that the porous carbon framework is more highly microporous, diffusion of lithium through very fine silicon structures becomes rate limited, reducing the rate capacity of the particulate material. Accordingly, controlling the upper limit of the silicon ratio ensures a degree of electrolyte access to the internal pore volume of the porous carbon framework, facilitating transport of lithium ions to the silicon domains.

Preferably the silicon mass in the composite particles is located substantially or entirely within the pores of the porous carbon framework in the form of the nanoscale silicon domains that are described above. For example, it is preferred that at least 90 wt %, more preferably at least 95 wt %, more preferably at least 98 wt %, more preferably at least 99 wt % of the silicon mass in the composite particles is located within the internal pore volume of the porous carbon framework such that there is no or very little silicon located on the external surface of the composite particles.

Preferably, the volume of micropores and mesopores in the composite particles (i.e. in the presence of the silicon), as measured by nitrogen gas adsorption, is no more than $0.15×P_1$, or no more than $0.10×P_1$, or no more than $0.05×P_1$, or no more than $0.02×P_1$.

The weight ratio of silicon to the porous carbon framework can be determined by elemental analysis. Elemental analysis is used to determine the weight percentages of both silicon and carbon in the composite particles. Optionally, the amounts of hydrogen, nitrogen and oxygen may also be determined by elemental analysis. Preferably, elemental analysis is also used to determine the weight percentage of carbon (and optionally hydrogen, nitrogen and oxygen) in the porous carbon framework alone. Determining the weight percentage of carbon in the in the porous carbon framework alone takes account of the possibility that the porous carbon framework contains a minor amount of heteroatoms within its molecular framework. Both measurements taken together allow the weight percentage of silicon relative to the entire porous carbon framework to be determined reliably.

The silicon content is determined by ICP-OES (Inductively coupled plasma-optical emission spectrometry). A number of ICP-OES instruments are commercially available, such as the iCAP® 7000 series of ICP-OES analyzers available from ThermoFisher Scientific. The carbon content of the composite particles and of the porous carbon framework alone (as well as the hydrogen, nitrogen and oxygen content if required) are determined by IR absorption-based elemental analysis. Suitable instruments for determining carbon, hydrogen, nitrogen and oxygen content include the TruSpec® Micro elemental analyser, the LECO model CS844 (carbon) and the LECO model ONH836 (hydrogen, nitrogen and oxygen), all available from Leco Corporation.

In certain aspects, the composite particles described herein are formed chiefly of silicon, carbon and oxygen (e.g., individually in the amounts as described above). In certain embodiments, the sum of the amount of silicon and carbon (measured as described above) of the composite particles is at least 80%, e.g., at least 85 wt %, at least 90 wt %, or at least 95 wt %. For example, in various embodiments, the sum of the amount of silicon and carbon is in the range of 80-98 wt %, or 85-98 wt %, or 90-98 wt %, or 95-98 wt %. In certain embodiments, the sum of the amount of silicon, carbon and oxygen (measured as described above) is at least 90 wt %, e.g., at least 95 wt %, at least 97 wt %, or at least 98 wt %. For example in various embodiments, the sum of the amount of silicon, carbon and oxygen is in the range of 90-105 wt %, or 90-100 wt %, or 90-99 wt %, or 95-105 wt %, or 95-100 wt %, or 97-105 wt %, or 97-100 wt %, or 98-105 wt %, or 98-100 wt %. The person of ordinary skill in the art will appreciate that the different measurement techniques used may result in a sum of the as-measured silicon, carbon, and oxygen amounts that are slightly above 100%. And as the person of ordinary skill in the art will appreciate, many of the elemental analysis techniques described herein are destructive, such that different test samples from a single composition must be tested to provide, e.g., a measurement of silicon weight percent and a measurement of carbon weight percent.

The composite particles preferably have a low total oxygen content. Oxygen may be present in the composite particles for instance as part of the porous carbon framework or as an oxide layer on any exposed silicon surfaces. Preferably, the total oxygen content of the composite particles is less than 15 wt %, more preferably less than 10 wt %, more preferably less than 5 wt %, for example less than 2 wt %, or less than 1 wt %, or less than 0.5 wt %.

The silicon may optionally comprise a minor amount of one or more dopants. Suitable dopants include boron and phosphorus, other n-type or p-type dopants, nitrogen, or germanium. Preferably, the dopants are present in a total amount of no more than 2 wt % based on the total amount of silicon and the dopant(s).

For the avoidance of doubt, the term "particle diameter" as used herein refers to the equivalent spherical diameter (esd), i.e. the diameter of a sphere having the same volume as a given particle, wherein the particle volume is understood to include the volume of any intra-particle pores. The terms "$D_{50}$" and "$D_{50}$ particle diameter" as used herein refer to the volume-based median particle diameter, i.e. the diameter below which 50% by volume of the particle population is found. The terms "$D_{10}$" and "$D_{10}$ particle diameter" as used herein refer to the 10th percentile volume-based median particle diameter, i.e. the diameter below which 10% by volume of the particle population is found. The terms "$D_{90}$" and "$D_{90}$ particle diameter" as used herein refer to the 90th percentile volume-based median particle diameter, i.e. the diameter below which 90% by volume of the particle population is found.

Particle diameters and particle size distributions are determined by routine laser diffraction techniques in accordance with ISO 13320:2009. Laser diffraction relies on the principle that a particle will scatter light at an angle that varies depending on the size the particle and a collection of particles will produce a pattern of scattered light defined by intensity and angle that can be related to a particle size distribution. A number of laser diffraction instruments are commercially available for the rapid and reliable determination of particle size distributions. Unless stated otherwise, particle size distribution measurements as specified or reported herein are as measured by the conventional Malvern Mastersizer™ 3000 particle size analyzer from Malvern Instruments. The Malvern Mastersizer™ 3000 particle size analyzer operates by projecting a helium-neon gas laser beam through a transparent cell containing the particles of interest suspended in an aqueous solution. Light rays which strike the particles are scattered through angles which are inversely proportional to the particle size and a photodetector array measures the intensity of light at several predetermined angles and the measured intensities at different angles are processed by a computer using standard theoretical principles to determine the particle size distribution. Laser diffraction values as reported herein are obtained using a wet dispersion of the particles in distilled water. The particle refractive index is taken to be 3.50 and the dispersant index is taken to be 1.330. Particle size distributions are calculated using the Mie scattering model.

The composite particles may have a $D_{50}$ particle diameter in the range from 0.5 to 20 μm.

Preferably, the $D_{50}$ particle diameter is at least 1 μm, more preferably at least 2 μm, for example at least 3 μm, or at least 4 μm, or at least 5 μm. Preferably, the $D_{50}$ particle diameter of the particulate material is no more than 18 μm, more preferably no more than 16 μm, more preferably no more than 14 μm, more preferably no more than 12 μm, more preferably no more than 10 μm, for example no more than 9 μm, or no more than 8 μm.

For instance, the composite particles may have a $D_{50}$ particle diameter in the range from 1 to 12 μm, or from 1 to 10 μm, or from 2 to 10 μm, or from 3 to 10 μm, or from 3 to 8 μm. Particles within these size ranges and having porosity and a pore diameter distribution as set out herein are ideally suited for use in hybrid anodes for metal-ion batteries, due to their dispersibility in slurries, their structural robustness, their capacity retention over repeated charge-discharge cycles, and their ability to occupy the interparticle void spaces between conventional graphite particles used in the electrode of metal-ion batteries.

The $D_{10}$ particle diameter of the composite particles is preferably at least 0.2 μm, or at least 0.5 μm, or at least 0.8 μm, or at least 1 μm, or at least 1.5 μm, or at least 2 μm. By maintaining the $D_{10}$ particle diameter at 0.2 μm or more, the potential for undesirable agglomeration of sub-micron sized particles is reduced, resulting in improved dispersibility of the particulate material and improved capacity retention.

The $D_{90}$ particle diameter of the composite particles is preferably no more than 40 μm, or no more than 30 μm, or no more than 20 μm, or no more than 15 μm, or no more than 12 μm, or no more than 10 μm. The presence of very large particles results in non-uniform forming packing of the particles in electrode active layers, thus disrupting the formation of dense electrode layers, particularly electrode layers having a thickness in the conventional range from 20 to 50 μm. Therefore, it is preferred that the $D_{90}$ particle diameter is no more than 20 μm, and more preferably lower still.

The composite particles preferably have a narrow size distribution span. For instance, the particle size distribution span (defined as $(D_{90}-D_{10})/D_{50}$) is preferably 5 or less, more preferably 4 or less, more preferably 3 or less, more preferably 2 or less, and most preferably 1.5 or less. By maintaining a narrow size distribution span, efficient packing of the particles into dense electrode layers is more readily achievable.

The composite particles may be spheroidal in shape. Spheroidal particles as defined herein may include both spherical and ellipsoidal particles and the shape of the composite particles of the invention may suitably be defined by reference to the sphericity and the aspect ratio of the particles of the invention. Spheroidal particles are found to be particularly well-suited to dispersion in slurries without the formation of agglomerates. In addition, the use of porous spheroidal particles is surprisingly found to provide a further improvement in strength when compared to porous particles and porous particle fragments of irregular morphology.

The sphericity of an object is conventionally defined as the ratio of the surface area of a sphere to the surface area of the object, wherein the object and the sphere have identical volume. However, in practice it is difficult to measure the surface area and volume of individual particles at the micron scale. However, it is possible to obtain highly accurate two-dimensional projections of micron scale particles by scanning electron microscopy (SEM) and by dynamic image analysis, in which a digital camera is used to record the shadow projected by a particle. The term "sphericity" as used herein shall be understood as the ratio of the area of the particle projection to the area of a circle, wherein the particle projection and circle have identical circumference. Thus, for an individual particle, the sphericity S may be defined as:

$$S = \frac{4 \cdot \pi \cdot A_m}{(C_m)^2}$$

wherein $A_m$ is the measured area of the particle projection and $C_m$ is the measured circumference of the particle projection. The average sphericity $S_{av}$ of a population of particles as used herein is defined as:

$$S_{av} = \frac{1}{n}\sum_{i=1}^{n}\left[\frac{4 \cdot \pi \cdot A_m}{(C_m)^2}\right]$$

wherein n represents the number of particles in the population.

As used herein, the term "spheroidal" as applied to the composite particles of the invention shall be understood to refer to a material having an average sphericity of at least 0.70. Preferably, the porous spheroidal particles of the invention have an average sphericity of at least 0.85, more preferably at least 0.90, more preferably at least 0.92, more preferably at least 0.93, more preferably at least 0.94, more preferably at least 0.95. Optionally, the porous spheroidal particles may have an average sphericity of at least 0.96, or at least 0.97, or at least 0.98, or at least 0.99.

It will be understood that the circumference and area of a two-dimensional particle projection will depend on the orientation of the particle in the case of any particle which is not perfectly spheroidal. However, the effect of particle orientation may be offset by reporting sphericity and aspect ratios as average values obtained from a plurality of particles having random orientation. A number of SEM and dynamic image analysis instruments are commercially available, allowing the sphericity and aspect ratio of a particulate material to be determined rapidly and reliably. Unless stated otherwise, sphericity values as specified or reported herein are as measured by a CamSizer XT particle analyzer from Retsch Technology GmbH. The CamSizer XT is a dynamic image analysis instrument which is capable of obtaining highly accurate distributions of the size and shape for particulate materials in sample volumes of from 100 mg to 100 g, allowing properties such as average sphericity and aspect ratios to be calculated directly by the instrument.

The composite particles preferably have a BET surface area of no more than 30 $m^2/g$, or no more than 25 $m^2/g$, or no more than 20 $m^2/g$, or no more than 15 $m^2/g$, or no more than 10 $m^2/g$. The term "BET surface area" as used herein should be taken to refer to the surface area per unit mass calculated from a measurement of the physical adsorption of gas molecules on a solid surface, using the Brunauer-Emmett-Teller theory, in accordance with ISO 9277. In general, a low BET surface area is preferred in order to minimize the formation of solid electrolyte interphase (SEI) layers at the surface of the composite particles during the first charge-discharge cycle of an anode comprising the particulate material of the invention. However, a BET surface area which is excessively low results in unacceptably low charging rate and capacity due to the inaccessibility of the bulk of the electroactive material to metal ions in the surrounding electrolyte. For instance, the BET surface area is preferably at least 0.1 $m^2/g$, or at least 1 $m^2/g$, or at least 2 $m^2/g$, or at least 5 $m^2/g$. For instance, the BET surface area may be in the range from 1 to 25 $m^2/g$, more preferably in the range from 2 to 15 $m^2/g$.

The particulate material of the invention typically has a specific charge capacity on first lithiation of 1200 to 2340 mAh/g. Preferably the particulate material of the invention has a specific charge capacity on first lithiation of at least 1400 mAh/g.

The composite particles of the invention are suitably prepared via the chemical vapor infiltration (CVI) of a silicon-containing precursor into the pore structure of the porous carbon framework. As used herein, CVI refers to processes in which a gaseous silicon-containing precursor is thermally decomposed on a surface to form elemental silicon at the surface and gaseous by-products.

Suitable gaseous silicon-containing precursors include silane ($SiH_4$), silane derivatives (e.g. disilane, trisilane and tetrasilane), and trichlorosilane ($SiHCl_3$). The silicon-containing precursors may be used either in pure form or more usually as a diluted mixture with an inert carrier gas, such as nitrogen or argon. For instance, the silicon-containing precursor may be used in an amount in the range from 0.5-20 vol %, or 1-10 vol %, or 1-5 vol % based on the total volume of the silicon-containing precursor and the inert carrier gas. The CVI process is suitably carried out at low partial pressure of silicon precursor with total pressure of 101.3 kPa (i.e. 1 atm), the remaining partial pressure made up to atmospheric pressure using an inert padding gas such as hydrogen, nitrogen or argon. Deposition temperatures ranging from 400-700° C. are used, for example from 450-550° C., or 450-500° C. The CVI process may suitably be performed in a fixed bed reactor, fluidized bed reactor, or rotary kiln.

As an example of a fixed-bed reactor method, 1.8 g of a particulate porous framework was placed on a stainless-steel plate at a constant thickness of 1 mm along its length. The plate was then placed inside a stainless-steel tube of outer diameter 60 mm with gas inlet and outlet lines located in the hot zone of a retort furnace. The furnace tube was purged with nitrogen gas for 30 minutes at room temperature, then the sample temperature was increased to 450-500° C. The nitrogen gas flow-rate is adjusted to ensure a gas residence time of at least 90 seconds in the furnace tube and maintained at that rate for 30 minutes. Then, the gas supply is switched from nitrogen to a mixture of monosilane in nitrogen at 1.25 vol. % concentration. Dosing of monosilane is performed over a 5-hour period with a reactor pressure maintained at 101.3 kPa (1 atm). After dosing has finished the gas flow rate is kept constant whilst the silane is purged from the furnace using nitrogen. The furnace is purged for 30 minutes under nitrogen before being cooled down to room temperature over several hours. The atmosphere is then switched over to air gradually over a period of two hours by switching the gas flow from nitrogen to air from a compressed air supply.

The particulate material of the invention may optionally include a conductive carbon coating. Suitably a conductive carbon coating may be obtained by a chemical vapor deposition (CVD) method. CVD is a well-known methodology in the art and comprises the thermal decomposition of a volatile carbon-containing gas (e.g. ethylene) onto the surface of the particulate material. Alternatively, the carbon coating may be formed by depositing a solution of a carbon-containing compound onto the surface of the particulate material followed by pyrolysis. The conductive carbon coating is sufficiently permeable to allow lithium access to the interior of the composite particles without excessive resistance, so as not to reduce the rate performance of the composite particles. For instance, the thickness of the carbon coating may suitably be in the range from 2 to 30 nm. Optionally, the carbon coating may be porous and/or may only cover partially the surface of the composite particles.

A carbon coating has the advantages that it further reduces the BET surface area of the particulate material by smoothing any surface defects and by filling any remaining surface microporosity, thereby further reducing first cycle loss. In addition, a carbon coating improves the conductivity of the surface of the composite particles, reducing the need for conductive additives in the electrode composition, and also creates an improved surface for the formation of a stable SEI layer, resulting in improved capacity retention on cycling.

In accordance with the first aspect of the invention, there is further provided particulate materials according to the following aspects 1a-1bb.

Aspect 1a: A particulate material as described above, wherein:
(i) $P_1$ is in the range from 0.7-1.4;
(ii) $\varphi_a$ is in the range from 0.5 to 0.8;
(iii) $\varphi_{10}$ is at least 0.8;
(iv) the $D_{50}$ particle size of the porous carbon framework is in the range from 1 to 18 μm.

Aspect 1b: A particulate material as described above, wherein:
(i) $P_1$ is in the range from 0.7-1.4;
(ii) $\varphi_a$ is in the range from 0.5 to 0.8;
(iii) $\varphi_{10}$ is at least 0.8;
(iv) the $D_{50}$ particle size of the porous carbon framework is in the range from 1 to 12 μm.

Aspect 1c: A particulate material as described above, wherein:
(i) $P_1$ is in the range from 0.7-1.4;
(ii) $\varphi_a$ is in the range from 0.5 to 0.8;
(iii) $\varphi_{10}$ is at least 0.8;
(iv) the $D_{50}$ particle size of the porous carbon framework is in the range from 2 to 8 μm.

Aspect 1d: A particulate material as described above, wherein:
(i) $P_1$ is in the range from 0.7-1.4;
(ii) $\varphi_a$ is in the range from 0.5 to 0.8;
(iii) $\varphi_5$ is at least 0.8;
(iv) the $D_{50}$ particle size of the porous carbon framework is in the range from 2 to 8 μm.

Aspect 1e: A particulate material as described above, wherein:
(i) $P_1$ is in the range from 0.8-1.2;
(ii) $\varphi_a$ is in the range from 0.6 to 0.8;
(iii) $\varphi_{10}$ is at least 0.8;
(iv) the $D_{50}$ particle size of the porous carbon framework is in the range from 1 to 18 μm.

Aspect 1f: A particulate material as described above, wherein:
(i) $P_1$ is in the range from 0.8-1.2;
(ii) $\varphi_a$ is in the range from 0.6 to 0.8;
(iii) $\varphi_{10}$ is at least 0.8;
(iv) the $D_{50}$ particle size of the porous carbon framework is in the range from 1 to 12 μm.

Aspect 1g: A particulate material as described above, wherein:
(i) $P_1$ is in the range from 0.8-1.2;
(ii) $\varphi_a$ is in the range from 0.6 to 0.8;
(iii) $\varphi_{10}$ is at least 0.8;
(iv) the $D_{50}$ particle size of the porous carbon framework is in the range from 2 to 8 μm.

Aspect 1h: A particulate material as described above, wherein:
(i) $P_1$ is in the range from 0.8-1.2;
(ii) $\varphi_a$ is in the range from 0.6 to 0.8;
(iii) $\varphi_5$ is at least 0.8;
(iv) the $D_{50}$ particle size of the porous carbon framework is in the range from 2 to 8 μm.

Aspect 1i: A particulate material as described above, wherein:
(i) $P_1$ is in the range from 0.7-1.4;
(ii) $\varphi_a$ is in the range from 0.5 to 0.8;
(iii) $\varphi_{10}$ is at least 0.8;
(iv) the $D_{50}$ particle size of the porous carbon framework is in the range from 1 to 18 μm;
(v) the weight ratio of silicon to the porous carbon framework is at least the value given by $[\varphi_b+0.8]\times P_1$, and preferably no more than the value given by $[\varphi_b+1.6]\times P_1$.

Aspect 1j: A particulate material as described above, wherein:
(i) $P_1$ is in the range from 0.7-1.4;
(ii) $\varphi_a$ is in the range from 0.5 to 0.8;
(iii) $\varphi_{10}$ is at least 0.8;
(iv) the $D_{50}$ particle size of the porous carbon framework is in the range from 1 to 12 μm;
(v) the weight ratio of silicon to the porous carbon framework is at least the value given by $[\varphi_b+0.8]\times P_1$, and preferably no more than the value given by $[\varphi_b+1.6]\times P_1$.

Aspect 1k: A particulate material as described above, wherein:
(i) $P_1$ is in the range from 0.7-1.4;
(ii) $\varphi_a$ is in the range from 0.5 to 0.8;
(iii) $\varphi_{10}$ is at least 0.8;

(iv) the $D_{50}$ particle size of the porous carbon framework is in the range from 2 to 8 μm
(v) the weight ratio of silicon to the porous carbon framework is at least the value given by $[\varphi_b+0.8]\times P_1$, and preferably no more than the value given by $[\varphi_b+1.6]\times P_1$.

Aspect 1l: A particulate material as described above, wherein:
(i) $P_1$ is in the range from 0.7-1.4;
(ii) $\varphi_a$ is in the range from 0.5 to 0.8;
(iii) $\varphi_5$ is at least 0.8;
(iv) the $D_{50}$ particle size of the porous carbon framework is in the range from 2 to 8 μm;
(v) the weight ratio of silicon to the porous carbon framework is at least the value given by $[\varphi_b+0.8]\times P_1$, and preferably no more than the value given by $[\varphi_b+1.6]\times P_1$.

Aspect 1m: A particulate material as described above, wherein:
(i) $P_1$ is in the range from 0.8-1.2;
(ii) $\varphi_a$ is in the range from 0.6 to 0.8;
(iii) $\varphi_{10}$ is at least 0.8;
(iv) the $D_{50}$ particle size of the porous carbon framework is in the range from 1 to 18 μm;
(v) the weight ratio of silicon to the porous carbon framework is at least the value given by $[\varphi_b+0.9]\times P_1$, and preferably no more than the value given by $[\varphi_b+1.5]\times P_1$.

Aspect 1n: A particulate material as described above, wherein:
(i) $P_1$ is in the range from 0.8-1.2;
(ii) $\varphi_a$ is in the range from 0.6 to 0.8;
(iii) $\varphi_{10}$ is at least 0.8;
(iv) the $D_{50}$ particle size of the porous carbon framework is in the range from 1 to 12 μm;
(v) the weight ratio of silicon to the porous carbon framework is at least the value given by $[\varphi_b+0.9]\times P_1$, and preferably no more than the value given by $[\varphi_b+1.5]\times P_1$.

Aspect 1o: A particulate material as described above, wherein:
(i) $P_1$ is in the range from 0.8-1.2;
(ii) $\varphi_a$ is in the range from 0.6 to 0.8;
(iii) $\varphi_{10}$ is at least 0.8;
(iv) the $D_{50}$ particle size of the porous carbon framework is in the range from 2 to 8 μm;
(v) the weight ratio of silicon to the porous carbon framework is at least the value given by $[\varphi_b+0.9]\times P_1$, and preferably no more than the value given by $[\varphi_b+1.5]\times P_1$.

Aspect 1p: A particulate material as described above, wherein:
(i) $P_1$ is in the range from 0.8-1.2;
(ii) $\varphi_a$ is in the range from 0.6 to 0.8;
(iii) $\varphi_5$ is at least 0.8;
(iv) the $D_{50}$ particle size of the porous carbon framework is in the range from 2 to 8 μm;
(v) the weight ratio of silicon to the porous carbon framework is at least the value given by $[\varphi_b+0.9]\times P_1$, and preferably no more than the value given by $[\varphi_b+1.5]\times P_1$.

Aspect 1q: A particulate material as described above, wherein:
(i) $P_1$ is in the range from 0.8-1.2;
(ii) $\varphi_a$ is in the range from 0.6 to 0.8;
(iii) $\varphi_{10}$ is at least 0.8;
(iv) the $D_{50}$ particle size of the porous carbon framework is in the range from 1 to 18 μm;
(v) the weight ratio of silicon to the porous carbon framework is at least the value given by $[\varphi_b+1]\times P_1$, and preferably no more than the value given by $[\varphi_b+1.5]\times P_1$.

Aspect 1r: A particulate material as described above, wherein:
(i) $P_1$ is in the range from 0.8-1.2;
(ii) $\varphi_a$ is in the range from 0.6 to 0.8;
(iii) $\varphi_{10}$ is at least 0.8;
(iv) the $D_{50}$ particle size of the porous carbon framework is in the range from 1 to 12 μm;
(v) the weight ratio of silicon to the porous carbon framework is at least the value given by $[\varphi_b+1]\times P_1$, and preferably no more than the value given by $[\varphi_b+1.5]\times P_1$.

Aspect 1s: A particulate material as described above, wherein:
(i) $P_1$ is in the range from 0.8-1.2;
(ii) $\varphi_a$ is in the range from 0.6 to 0.8;
(iii) $\varphi_{10}$ is at least 0.8;
(iv) the $D_{50}$ particle size of the porous carbon framework is in the range from 2 to 8 μm;
(v) the weight ratio of silicon to the porous carbon framework is at least the value given by $[\varphi_b+1]\times P_1$, and preferably no more than the value given by $[\varphi_b+1.5]\times P_1$.

Aspect 1t: A particulate material as described above, wherein:
(i) $P_1$ is in the range from 0.8-1.2;
(ii) $\varphi_a$ is in the range from 0.6 to 0.8;
(iii) $\varphi_5$ is at least 0.8;
(iv) the $D_{50}$ particle size of the porous carbon framework is in the range from 2 to 8 μm;
(v) the weight ratio of silicon to the porous carbon framework is at least the value given by $[\varphi_b+1]\times P_1$, and preferably no more than the value given by $[\varphi_b+1.5]\times P_1$.

Aspect 1u: A particulate material as described above, wherein:
(i) $P_1$ is in the range from 0.7-1.4;
(ii) $\varphi_a$ is in the range from 0.5 to 0.8;
(iii) $\varphi_{10}$ is at least 0.8;
(iv) the $D_{50}$ particle size of the porous carbon framework is in the range from 1 to 18 μm;
(v) the weight ratio of silicon to the porous carbon framework is in the range from $[1.2\times P_1$ to $1.8\times P_1]:1$.

Aspect 1v: A particulate material as described above, wherein:
(i) $P_1$ is in the range from 0.7-1.4;
(ii) $\varphi_a$ is in the range from 0.5 to 0.8;
(iii) $\varphi_{10}$ is at least 0.8;
(iv) the $D_{50}$ particle size of the porous carbon framework is in the range from 1 to 12 μm;
(v) the weight ratio of silicon to the porous carbon framework is in the range from $[1.2\times P_1$ to $1.8\times P_1]:1$.

Aspect 1w: A particulate material as described above, wherein:
(i) $P_1$ is in the range from 0.7-1.4;
(ii) $\varphi_a$ is in the range from 0.5 to 0.8;
(iii) $\varphi_{10}$ is at least 0.8;
(iv) the $D_{50}$ particle size of the porous carbon framework is in the range from 2 to 8 μm
(v) the weight ratio of silicon to the porous carbon framework is in the range from $[1.2\times P_1$ to $1.8\times P_1]:1$.

Aspect 1x: A particulate material as described above, wherein:
(i) $P_1$ is in the range from 0.7-1.4;
(ii) $\varphi_a$ is in the range from 0.5 to 0.8;
(iii) $\varphi_5$ is at least 0.8;
(iv) the $D_{50}$ particle size of the porous carbon framework is in the range from 2 to 8 μm;
(v) the weight ratio of silicon to the porous carbon framework is in the range from $[1.2 \times P_1$ to $1.8 \times P_1]:1$.

Aspect 1y: A particulate material as described above, wherein:
(i) $P_1$ is in the range from 0.8-1.2;
(ii) $\varphi_a$ is in the range from 0.6 to 0.8;
(iii) $\varphi_{10}$ is at least 0.8;
(iv) the $D_{50}$ particle size of the porous carbon framework is in the range from 1 to 18 μm;
(v) the weight ratio of silicon to the porous carbon framework is in the range from $[1.2 \times P_1$ to $1.6 \times P_1]:1$.

Aspect 1z: A particulate material as described above, wherein:
(i) $P_1$ is in the range from 0.8-1.2;
(ii) $\varphi_a$ is in the range from 0.6 to 0.8;
(iii) $\varphi_{10}$ is at least 0.8;
(iv) the $D_{50}$ particle size of the porous carbon framework is in the range from 1 to 12 μm;
(v) the weight ratio of silicon to the porous carbon framework is in the range from $[1.2 \times P_1$ to $1.6 \times P_1]:1$.

Aspect 1aa: A particulate material as described above, wherein:
(i) $P_1$ is in the range from 0.8-1.2;
(ii) $\varphi_a$ is in the range from 0.6 to 0.8;
(iii) $\varphi_{10}$ is at least 0.8;
(iv) the $D_{50}$ particle size of the porous carbon framework is in the range from 2 to 8 μm;
(v) the weight ratio of silicon to the porous carbon framework is in the range from $[1.2 \times P_1$ to $1.6 \times P_1]:1$.

Aspect 1bb: A particulate material as described above, wherein:
(i) $P_1$ is in the range from 0.8-1.2;
(ii) $\varphi_a$ is in the range from 0.6 to 0.8;
(iii) $\varphi_5$ is at least 0.8;
(iv) the $D_{50}$ particle size of the porous carbon framework is in the range from 2 to 8 μm;
(v) the weight ratio of silicon to the porous carbon framework is in the range from $[1.2 \times P_1$ to $1.6 \times P_1]:1$.

In accordance with the present invention, it is to be understood that the preferred/optional features disclosed herein in relation to the first aspect of the invention that fall within the scope of the above-described aspects 1a to 1bb are also to be taken as preferred/optional features of the aspects 1a to 1bb. Likewise, any features of the dependent claims that fall within the scope of the above-described aspects 1a to 1bb are also to be interpreted as though those claims also depended from aspects 1a to 1bb.

In a second aspect of the invention, there is provided a composition comprising a particulate material according to the first aspect of the invention and at least one other component. In particular, the particulate material of the first aspect of the invention may be used as a component of an electrode composition. The particulate material used to prepare the composition of the second aspect of the invention may have any of the features described as preferred or optional with regard to the first aspect of the invention, and may be a particulate material according to any of aspects 1a to 1 bb.

Thus, there is provided a composition comprising a particulate material according to the first aspect of the invention and at least one other component selected from: (i) a binder; (ii) a conductive additive; and (iii) an additional particulate electroactive material.

The particulate material used to prepare the composition of the second aspect of the invention may have any of the features described as preferred or optional with regard to the first aspect of the invention.

The composition is preferably a hybrid electrode composition which comprises a particulate material according to the first aspect of the invention and at least one additional particulate electroactive material.

The at least one additional particulate electroactive material preferably has a specific capacity on lithiation in the range from 100 to 600 mAh/g, or from 200 to 500 mAh/g, or from 200 to 500 mAh/g. Examples of additional particulate electroactive materials include graphite, hard carbon, silicon, tin, germanium, gallium, aluminium and lead. The at least one additional particulate electroactive material is preferably selected from graphite and hard carbon, and most preferably the at least one additional particulate electroactive material is graphite.

The at least one additional particulate electroactive material preferably has a $D_{50}$ particle diameter in the range from 10 to 50 μm, preferably from 10 to 40 μm, more preferably from 10 to 30 μm and most preferably from 10 to 25 μm, for example from 15 to 25 μm.

The $D_{10}$ particle diameter of the at least one additional particulate electroactive material is preferably at least 5 μm, more preferably at least 6 μm, more preferably at least 7 μm, more preferably at least 8 μm, more preferably at least 9 μm, and still more preferably at least 10 μm.

The $D_{90}$ particle diameter of the at least one additional particulate electroactive material is preferably no more than 100 μm, more preferably no more than 80 μm, more preferably no more than 60 μm, more preferably no more than 50 μm, and most preferably no more than 40 μm.

The at least one additional particulate electroactive material is preferably selected from graphite and hard carbon particles having a $D_{50}$ particle diameter in the range from 10 to 50 μm. Still more preferably, the at least one additional particulate electroactive material is selected from graphite particles, wherein the graphite particles have a $D_{50}$ particle diameter in the range from 10 to 50 μm.

The at least one additional particulate electroactive material is preferably in the form of spheroidal particles having an average sphericity of at least 0.70, preferably at least 0.85, more preferably at least 0.90, more preferably at least 0.92, more preferably at least 0.93, more preferably at least 0.94, and most preferably at least 0.95.

The at least one additional particulate electroactive material preferably has an average aspect ratio of less than 3:1, preferably no more than 2.5:1, more preferably no more than 2:1, more preferably no more than 1.8:1, more preferably no more than 1.6:1, more preferably no more than 1.4:1 and most preferably no more than 1.2:1.

The particulate material of the invention may constitute from 0.5 to 80 wt % of the total dry weight of the electroactive materials in the composition. For instance, the particulate material of the invention may constitute from 2 to 70 wt %, or from 4 to 60 wt %, or from 5 to 50 wt % of the total dry weight of the electroactive materials in the composition.

In the case that the composition is a hybrid electrode composition comprising at least one additional particulate electroactive material as described above, the electrode composition preferably comprises from 1 to 20 wt %, or from 2 to 15 wt %, or from 2 to 10 wt %, or from 2 to 5 wt % of the particulate material of the invention, based on the total dry weight of the composition.

Furthermore, in the case that the composition is a hybrid electrode composition, the electrode composition preferably comprises from 10 to 98 wt %, or from 15 to 97 wt %, or from 20 to 97 wt %, or from 25 to 97 wt % of the at least one additional particulate electroactive material, based on the total dry weight of the composition.

The ratio of the at least one additional particulate electroactive material to the particulate material of the invention is suitably in the range from 50:50 to 99:1 by weight, more preferably from 60:40 to 98:2 by weight, more preferably 70:30 to 97:3 by weight, more preferably 80:20 to 96:4 by weight, and most preferably 85:15 to 95:5 by weight.

The at least one additional particulate electroactive material and the particulate material of the invention together preferably constitute at least 50 wt %, more preferably at least 60% by weight of, more preferably at least 70 wt %, and most preferably at least 80 wt %, for example at least 85 wt %, at least 90 wt %, or at least 95 wt % of the total weight of the composition.

The composition may optionally comprise a binder. A binder functions to adhere the composition to a current collector and to maintain the integrity of the composition. Examples of binders which may be used in accordance with the present invention include polyvinylidene fluoride (PVDF), polyacrylic acid (PAA) and alkali metal salts thereof, modified polyacrylic acid (mPAA) and alkali metal salts thereof, carboxymethylcellulose (CMC), modified carboxymethylcellulose (mCMC), sodium carboxymethylcellulose (Na-CMC), polyvinylalcohol (PVA), alginates and alkali metal salts thereof, styrene-butadiene rubber (SBR) and polyimide. The composition may comprise a mixture of binders. Preferably, the binder comprises polymers selected from polyacrylic acid (PAA) and alkali metal salts thereof, and modified polyacrylic acid (mPAA) and alkali metal salts thereof, SBR and CMC.

The binder may suitably be present in an amount of from 0.5 to 20 wt %, preferably 1 to 15 wt % and most preferably 2 to 10 wt %, based on the total dry weight of the composition.

The binder may optionally be present in combination with one or more additives that modify the properties of the binder, such as cross-linking accelerators, coupling agents and/or adhesive accelerators.

The composition may optionally comprise one or more conductive additives. Preferred conductive additives are non-electroactive materials which are included so as to improve electrical conductivity between the electroactive components of the electrode composition and between the electroactive components of the electrode composition and a current collector. The conductive additives may suitably be selected from carbon black, carbon fibers, carbon nanotubes, graphene, acetylene black, ketjen black, metal fibers, metal powders and conductive metal oxides. Preferred conductive additives include carbon black and carbon nanotubes.

The one or more conductive additives may suitably be present in a total amount of from 0.5 to 20 wt %, preferably 1 to 15 wt % and most preferably 2 to 10 wt %, based on the total dry weight of the electrode composition.

In a third aspect, the invention provides an electrode comprising a particulate material as defined with reference to the first aspect of the invention in electrical contact with a current collector. The particulate material used to prepare the electrode of the third aspect of the invention may have any of the features described as preferred or optional with regard to the first aspect of the invention, and may be a particulate material according to any of aspects 1a to 1bb.

As used herein, the term current collector refers to any conductive substrate which is capable of carrying a current to and from the electroactive particles in the electrode composition. Examples of materials that can be used as the current collector include copper, aluminium, stainless steel, nickel, titanium and sintered carbon. Copper is a preferred material. The current collector is typically in the form of a foil or mesh having a thickness of between 3 to 500 µm. The particulate materials of the invention may be applied to one or both surfaces of the current collector to a thickness which is preferably in the range from 10 µm to 1 mm, for example from 20 to 500 µm, or from 50 to 200 µm.

Preferably, the electrode comprises an electrode composition as defined with reference to the second aspect of the invention in electrical contact with a current collector. The electrode composition may have any of the features described as preferred or optional with regard to the second aspect of the invention.

The electrode of the third aspect of the invention may suitably be fabricated by combining the particulate material of the invention (optionally in the form of the electrode composition of the invention) with a solvent and optionally one or more viscosity modifying additives to form a slurry. The slurry is then cast onto the surface of a current collector and the solvent is removed, thereby forming an electrode layer on the surface of the current collector. Further steps, such as heat treatment to cure any binders and/or calendaring of the electrode layer may be carried out as appropriate. The electrode layer suitably has a thickness in the range from 20 µm to 2 mm, preferably 20 µm to 1 mm, preferably 20 µm to 500 µm, preferably 20 µm to 200 µm, preferably 20 µm to 100 µm, preferably 20 µm to 50 µm.

Alternatively, the slurry may be formed into a freestanding film or mat comprising the particulate material of the invention, for instance by casting the slurry onto a suitable casting template, removing the solvent and then removing the casting template. The resulting film or mat is in the form of a cohesive, freestanding mass which may then be bonded to a current collector by known methods.

The electrode of the third aspect of the invention may be used as the anode of a metal-ion battery. Thus, in a fourth aspect, the present invention provides a rechargeable metal-ion battery comprising an anode, the anode comprising an electrode as described above, a cathode comprising a cathode active material capable of releasing and reabsorbing metal ions; and an electrolyte between the anode and the cathode. The particulate material used to prepare the battery of the fourth aspect of the invention may have any of the features described as preferred or optional with regard to the first aspect of the invention, and may be a particulate material according to any of aspects 1a to 1 bb.

The metal ions are preferably lithium ions. More preferably the rechargeable metal-ion battery of the invention is a lithium-ion battery, and the cathode active material is capable of releasing and lithium ions.

The cathode active material is preferably a metal oxide-based composite. Examples of suitable cathode active materials include $LiCoO_2$, $LiCo_{0.99}Al_{0.01}O_2$, $LiNiO_2$, $LiMnO_2$, $LiCo_{0.5}Ni_{0.5}O_2$, $LiCo_{0.7}Ni_{0.3}O_2$, $LiCo_{0.8}Ni_{0.2}O_2$, $LiCo_{0.82}Ni_{0.18}O_2$, $LiCo_{0.8}Ni_{0.15}Al_{0.5}O_2$, $LiNi_{0.4}Co_{0.3}Mn_{0.3}O_2$ and $LiNi_{0.33}Co_{0.33}Mn_{0.34}O_2$. The cathode current collector is generally of a thickness of between 3 to 500 µm. Examples of materials that can be used as the cathode current collector include aluminium, stainless steel, nickel, titanium and sintered carbon.

The electrolyte is suitably a non-aqueous electrolyte containing a metal salt, e.g. a lithium salt, and may include, without limitation, non-aqueous electrolytic solutions, solid electrolytes and inorganic solid electrolytes. Examples of non-aqueous electrolyte solutions that can be used include non-protic organic solvents such as propylene carbonate, ethylene carbonate, butylene carbonates, dimethyl carbonate, diethyl carbonate, gamma butyrolactone, 1,2-dimethoxyethane, 2-methyltetrahydrofuran, dimethylsulfoxide, 1,3-dioxolane, formamide, dimethylformamide, acetonitrile, nitromethane, methylformate, methyl acetate, phosphoric acid triesters, trimethoxymethane, sulfolane, methyl sulfolane and 1,3-dimethyl-2-imidazolidinone.

Examples of organic solid electrolytes include polyethylene derivatives polyethyleneoxide derivatives, polypropylene oxide derivatives, phosphoric acid ester polymers, polyester sulfide, polyvinylalcohols, polyvinylidine fluoride and polymers containing ionic dissociation groups.

Examples of inorganic solid electrolytes include nitrides, halides and sulfides of lithium salts such as $Li_5NI_2$, $Li_3N$, LiI, $LiSiO_4$, $Li_2SiS_3$, $Li_4SiO_4$, LiOH and $Li_3PO_4$.

The lithium salt is suitably soluble in the chosen solvent or mixture of solvents. Examples of suitable lithium salts include LiCl, LiBr, LiI, $LiClO_4$, $LiBF_4$, $LiBC_4O_8$, $LiPF_6$, $LiCF_3SO_3$, $LiAsF_6$, $LiSbF_6$, $LiAlCl_4$, $CH_3SO_3Li$ and $CF_3SO_3Li$.

Where the electrolyte is a non-aqueous organic solution, the metal-ion battery is preferably provided with a separator interposed between the anode and the cathode. The separator is typically formed of an insulating material having high ion permeability and high mechanical strength. The separator typically has a pore diameter of between 0.01 and 100 µm and a thickness of between 5 and 300 µm. Examples of suitable electrode separators include a micro-porous polyethylene film.

The separator may be replaced by a polymer electrolyte material and in such cases the polymer electrolyte material is present within both the composite anode layer and the composite cathode layer. The polymer electrolyte material can be a solid polymer electrolyte or a gel-type polymer electrolyte.

In a fifth aspect, the invention provides the use of a particulate material as defined with reference to the first aspect of the invention as an anode active material. Preferably, the particulate material is in the form of an electrode composition as defined with reference to the second aspect of the invention, and most preferably the electrode composition comprises one or more additional particulate electroactive materials as defined above. The particulate material used according to the fifth aspect of the invention may have any of the features described as preferred or optional with regard to the first aspect of the invention, and may be a particulate material according to any of aspects 1a to 1bb.

The invention claimed is:

1. A particulate material comprising a plurality of composite particles, wherein the composite particles comprise:
    (a) a porous carbon framework comprising micropores and mesopores, wherein
        (i) the micropores and mesopores have a total pore volume as measured by gas adsorption of $P_1$ cm³/g, wherein $P_1$ has a value of at least 0.6 and no more than 2,
        (ii) the volume fraction of micropores ($\varphi_a$) is in the range from 0.5 to 0.9, based on the total volume of micropores and mesopores;
        (iii) the volume fraction of pores having a pore diameter no more than 10 nm ($\varphi_{10}$) is at least 0.75, based on the total volume of micropores and mesopores, and
        (iv) the porous carbon framework has a $D_{50}$ particle size of less than 20 µm;
    (b) a plurality of nanoscale elemental silicon domains located within the micropores and/or mesopores of the porous carbon framework;
wherein the weight ratio of silicon to the porous carbon framework in the composite particles is in the range from $[1 \times P_1$ to $1.9 \times P_1]:1$.

2. A particulate material according to claim 1, wherein $P_1$ has a value of at least 0.65.

3. A particulate material according to claim 1, wherein $P_1$ has a value of no more than 1.8.

4. A particulate material according to claim 1, wherein the volume fraction of micropores ($\varphi_a$) is in the range from 0.5 to 0.85.

5. A particulate material according to claim 1, wherein the weight ratio of silicon to the porous carbon framework in the composite particles is at least the value given by $[\varphi_b+0.75] \times P_1$, wherein $\varphi_b$ represents the volume fraction of mesopores, based on the total volume of micropores and mesopores.

6. A particulate material according to claim 1, wherein the weight ratio of silicon to the porous carbon framework in the composite particles is at least the value given by $[\varphi_b+1] \times P_1$.

7. A particulate material according to claim 1, wherein the weight ratio of silicon to the porous carbon framework in the composite particles is at least the value given by $[\varphi_b+1.1] \times P_1$.

8. A particulate material according to claim 1, wherein the weight ratio of silicon to the porous carbon framework in the composite particles is no more than the value given by $[\varphi_b+1.6] \times P_1$.

9. A particulate material according to claim 1, wherein the weight ratio of silicon to the porous carbon framework in the composite particles is no more than the value given by $[\varphi_b+1.5] \times P_1$.

10. A particulate material according to claim 1, wherein the weight ratio of silicon to the porous carbon framework in the composite particles is at least $1.1 \times P_1$.

11. A particulate material according to claim 1, wherein the volume fraction of pores having a pore diameter of no more than 10 nm ($\varphi_{10}$) is at least 0.75, based on the total volume of micropores and mesopores.

12. A particulate material according to claim 1, wherein the volume fraction of pores having a pore diameter of no more than 5 nm ($\varphi_5$) is at least 0.7, based on the total volume of micropores and mesopores.

13. A particulate material according to claim 1, wherein the porous carbon framework has a monomodal pore size distribution.

14. A particulate material according to claim 1, wherein the porous carbon framework has a bimodal or multimodal pore size distribution.

15. A particulate material according to claim 1, wherein the porous carbon framework comprises macropores having a diameter in the range from greater than 50 nm to 100 nm having a total volume $P_2$ cm³/g as measured by mercury porosimetry, wherein $P_2$ is no more than $0.2 \times P_1$.

16. A particulate material according to claim 1, wherein the composite particles have a $D_{50}$ particle diameter of at least 0.5 µm.

17. A particulate material according to claim 1, wherein the composite particles have a $D_{50}$ particle diameter of no more than 18 µm.

18. A particulate material according to claim 1, wherein the composite particles have a $D_{10}$ particle diameter of at least 0.2 μm.

19. A particulate material according to claim 1, wherein the composite particles have a $D_{90}$ particle diameter of no more than 40 μm.

20. A particulate material according to claim 1, wherein the composite particles have a BET surface area of at least 0.1 $m^2/g$ and no more than 30 $m^2/g$.

21. A particulate material according to claim 1, wherein $P_1$ has a value of at least 0.65 and no more than 1.8;
the volume fraction of micropores ($\varphi_a$) is in the range from 0.55 to 0.8; and
the weight ratio of silicon to the porous carbon framework in the composite particles is no more than the value given by $[\varphi_b+1.6] \times P_1$.

22. A particulate material according to claim 21, wherein the weight ratio of silicon to the porous carbon framework in the composite particles is at least the value given by $[\varphi_b+0.75] \times P_1$, wherein $\varphi_b$ represents the volume fraction of mesopores, based on the total volume of micropores and mesopores.

23. A particulate material according to claim 1, having specific capacity on lithiation of 1200 to 2340 mAh/g.

24. A composition comprising a particulate material as defined in claim 1, and at least one other component selected from: (i) a binder; (ii) a conductive additive; and (iii) an additional particulate electroactive material.

25. A composition according to claim 24, comprising from 1 to 20 wt % of the particulate material, based on the total dry weight of the composition.

26. A composition according to claim 24, comprising from 10 to 98 wt % of the at least one additional particulate electroactive material, based on the total dry weight of the composition.

27. A composition according to claim 24, wherein the at least one additional particulate electroactive material has a specific capacity on lithiation in the range from 100 to 600 mAh/g.

28. An electrode comprising a particulate material as defined in claim 1 electrical contact with a current collector.

29. A rechargeable metal-ion battery comprising:
(i) an anode, wherein the anode comprises an electrode as described in claim 28;
(ii) a cathode comprising a cathode active material capable of releasing and reabsorbing metal ions; and
(iii) an electrolyte between the anode and the cathode.

* * * * *